(12) United States Patent
Shargots

(10) Patent No.: US 10,096,388 B2
(45) Date of Patent: ***Oct. 9, 2018

(54) EXTRUDED GUIDE FRAME AND MANUFACTURING METHODS THEREOF

(71) Applicant: Babcock & Wilcox mPower, Inc., Charlotte, NC (US)

(72) Inventor: Scott J Shargots, Forest, VA (US)

(73) Assignee: BWXT mPower, Inc., Charlotte, NC (US)

( * ) Notice: Subject to any disclaimer, the term of this patent is extended or adjusted under 35 U.S.C. 154(b) by 1363 days.

This patent is subject to a terminal disclaimer.

(21) Appl. No.: 14/215,119

(22) Filed: Mar. 17, 2014

(65) Prior Publication Data
US 2018/0261338 A1 Sep. 13, 2018

Related U.S. Application Data

(60) Provisional application No. 61/791,877, filed on Mar. 15, 2013.

(51) Int. Cl.
*G21C 7/117* (2006.01)
*G21C 7/08* (2006.01)
(Continued)

(52) U.S. Cl.
CPC ............... *G21C 7/08* (2013.01); *G21C 7/117* (2013.01); *G21C 7/12* (2013.01); *G21C 21/18* (2013.01)

(58) Field of Classification Search
CPC ........... G21C 7/117; G21C 11/08; G21F 3/04; G21F 5/005; G21F 5/06
See application file for complete search history.

(56) References Cited

U.S. PATENT DOCUMENTS 3,015,616 A   1/1962  Stuartz et al.
3,212,978 A  10/1965  Short et al.
(Continued)

FOREIGN PATENT DOCUMENTS

CN       1515011 A    7/2004
JP    62-044686 A    2/1987
(Continued)

OTHER PUBLICATIONS

International Search Report and Written Opinion for PCT/US14/30152 dated Nov. 17, 2014.

*Primary Examiner* — Sharon M Davis
(74) *Attorney, Agent, or Firm* — Nelson Mullins Riley & Scarborough LLP

(57) ABSTRACT

A control rod guide frame has a central passage of constant cross-section as a function of position along a central axis that passes through the central passage. The central passage is sized and shaped to guide a traveling assembly including at least one control rod as it moves along the central axis. The control rod guide frame comprises at least two radial guide frame sections secured around and defining the central passage. Each radial guide frame section may comprise an extruded radial guide frame section, which may be made of extruded steel. The central passage may include control rod guidance channels parallel the central axis and machined into the extruded radial guide frame sections. The at least two radial guide frame sections may be interchangeable. In some embodiments the at least two radial guide frame sections consist of between four and eight radial guide frame sections.

15 Claims, 10 Drawing Sheets

(51) Int. Cl.
*G21C 7/12* (2006.01)
*G21C 21/18* (2006.01)

(56) References Cited

U.S. PATENT DOCUMENTS

| | | | |
|---|---|---|---|
| 3,379,619 A | 4/1968 | Andrews et al. |
| 3,527,670 A | 9/1970 | Winders |
| 3,607,629 A | 9/1971 | Frisch et al. |
| 3,650,895 A | 3/1972 | Sodergard |
| 3,734,825 A | 5/1973 | Schabert et al. |
| 3,853,699 A | 12/1974 | Frisch et al. |
| 3,853,702 A | 12/1974 | Bevilacqua et al. |
| 3,857,599 A | 12/1974 | Jones et al. |
| 3,959,072 A | 5/1976 | Dupen |
| 4,057,467 A | 11/1977 | Kostrzewa |
| 4,072,563 A | 2/1978 | McDonald et al. |
| 4,124,442 A | 11/1978 | Zhuchkov et al. |
| 4,175,004 A | 11/1979 | Jabsen |
| 4,187,145 A | 2/1980 | Noyes et al. |
| 4,219,386 A | 8/1980 | Osborne et al. |
| 4,231,843 A | 11/1980 | Myron et al. |
| 4,235,674 A | 11/1980 | Yue |
| 4,252,613 A | 2/1981 | Jabsen |
| 4,313,797 A | 2/1982 | Attix |
| 4,420,456 A | 12/1983 | Nickel et al. |
| 4,472,348 A | 9/1984 | Desfontaines |
| 4,484,093 A | 11/1984 | Smith |
| 4,562,038 A | 12/1985 | Assedo et al. |
| 4,569,705 A | 2/1986 | Allan |
| 4,574,070 A * | 3/1986 | Blaushild | G21C 11/08 376/260 |
| 4,598,738 A | 7/1986 | Weber et al. |
| 4,618,471 A | 10/1986 | Defaucheux et al. |
| 4,640,811 A | 2/1987 | Peletan |
| 4,663,576 A | 5/1987 | Scarola et al. |
| 4,678,623 A | 7/1987 | Malandra et al. |
| 4,681,728 A | 7/1987 | Veronesi et al. |
| 4,683,106 A | 7/1987 | Jahnke |
| 4,687,628 A | 8/1987 | Gillett et al. |
| 4,759,904 A | 7/1988 | Gillett et al. |
| 4,762,669 A | 8/1988 | Doshi |
| 4,857,265 A | 8/1989 | Pol et al. |
| 4,902,468 A | 2/1990 | Veronesi et al. |
| 4,963,318 A | 10/1990 | Johansson et al. |
| 4,975,239 A | 12/1990 | O'Neil et al. |
| 4,983,351 A | 1/1991 | Tower et al. |
| 4,986,954 A | 1/1991 | Feurgard |
| 5,006,305 A | 4/1991 | Denizou |
| 5,024,808 A | 6/1991 | Land et al. |
| 5,183,628 A | 2/1993 | Baujat et al. |
| 5,207,978 A | 5/1993 | Barbe |
| 5,237,595 A | 8/1993 | Woodcock |
| 5,241,570 A | 8/1993 | Challberg |
| 5,276,719 A | 1/1994 | Batheja et al. |
| 5,328,667 A | 7/1994 | Johnson |
| 5,361,279 A | 11/1994 | Kobsa et al. |
| 5,386,440 A | 1/1995 | Kashiwai et al. |
| 5,715,288 A | 2/1998 | Matteson |
| 5,844,958 A | 12/1998 | Leroux et al. |
| 5,930,321 A | 7/1999 | Harkness et al. |
| 6,097,779 A | 8/2000 | Challberg et al. |
| 6,118,838 A * | 9/2000 | Robert | G21C 19/07 250/506.1 |
| 6,130,927 A | 10/2000 | Kang et al. |
| 6,167,104 A | 12/2000 | Garzarolli et al. |
| 6,275,557 B2 | 8/2001 | Nylund et al. |
| 6,477,219 B2 | 11/2002 | Hirukawa et al. |
| 6,489,623 B1 | 12/2002 | Peters et al. |
| 6,636,578 B1 | 10/2003 | Clark |
| 6,636,580 B2 | 10/2003 | Murakami et al. |
| 6,819,733 B2 | 11/2004 | Broders et al. |
| 6,865,242 B2 | 3/2005 | Barbe et al. |
| 7,085,340 B2 | 8/2006 | Goldenfield et al. |
| 7,257,185 B1 | 8/2007 | Yamada et al. |
| 7,289,590 B2 | 10/2007 | Joly et al. |
| 7,453,972 B2 | 11/2008 | Hellandbrand, Jr. et al. |
| 7,561,654 B2 | 7/2009 | Makovicka et al. |
| 7,668,280 B2 | 2/2010 | Hellandbrand, Jr. et al. |
| 7,668,284 B2 | 2/2010 | Sparrow et al. |
| 7,672,418 B2 | 3/2010 | Aktas et al. |
| 8,102,961 B2 | 1/2012 | Aktas et al. |
| 2006/0207672 A1 | 9/2006 | Henriksson et al. |
| 2006/0222140 A1 | 10/2006 | Aleshin et al. |
| 2008/0145174 A1 | 6/2008 | Suzuki et al. |
| 2008/0253497 A1 | 10/2008 | Singleton et al. |
| 2009/0060114 A1 | 3/2009 | Defilippis |
| 2010/0150294 A1 | 6/2010 | Weisel et al. |
| 2010/0316177 A1 | 12/2010 | Stambaugh et al. |
| 2010/0316181 A1 | 12/2010 | Thome et al. |
| 2011/0222640 A1 | 9/2011 | Desantis |
| 2012/0014493 A1 | 1/2012 | Frank et al. |
| 2012/0051482 A1 | 3/2012 | Shargots et al. |
| 2012/0069947 A1 | 3/2012 | Ketcham et al. |
| 2012/0076254 A1 | 3/2012 | Malloy et al. |
| 2012/0099691 A1 | 4/2012 | Shargots et al. |
| 2013/0270460 A1* | 10/2013 | Erasmus | G21C 11/06 250/505.1 |

FOREIGN PATENT DOCUMENTS

| | | |
|---|---|---|
| JP | 01-147396 A | 6/1989 |
| TW | 255969 B | 9/1995 |
| TW | 200845042 A | 11/2008 |

* cited by examiner

EXTRUDED GUIDE FRAME AND MANUFACTURING METHODS THEREOF

This application claims the benefit of U.S. Provisional Application No. 61/791,877 filed Mar. 15, 2013 and titled "EXTRUDED GUIDE FRAME AND MANUFACTURING METHODS THEREOF". U.S. Provisional Application No. 61/791,877 filed Mar. 15, 2013 and titled "EXTRUDED GUIDE FRAME AND MANUFACTURING METHODS THEREOF" is hereby incorporated by reference in its entirety into the specification of this application.

BACKGROUND

The following relates in general, to the field of nuclear power reactor arts, nuclear reaction control apparatus arts, control rod assembly arts, and related arts. More particularly, the following is directed to control rod guide frames and manufacturing methods thereof.

In nuclear power plants, a nuclear reactor core comprises a fissile material having size and composition selected to support a desired nuclear fission chain reaction. To moderate the reaction, a neutron absorbing medium may be provided, such as light water ($H_2O$) in the case of light water reactors, or heavy water ($D_2O$) in the case of heavy water reactors. The reaction may be controlled or stopped by inserting "control rods" comprising a neutron-absorbing material into aligned passages within the reactor core. When inserted, the control rods absorb neutrons so as to slow or stop the chain reaction. The control rods are operated by control rod drive mechanisms (CRDMs). In so-called "gray" control rods, the insertion of the control rods is continuously adjustable so as to provide continuously adjustable reaction rate control. In so-called "shutdown" control rods, the insertion is either fully in or fully out. During normal operation the shutdown rods are fully retracted from the reactor core; during a SCRAM, the shutdown rods are rapidly fully inserted so as to rapidly stop the chain reaction. Control rods can also be designed to perform both gray rod and shutdown rod functions. Typically, a number of control rods are connected with a single CRDM by an assembly including a connecting rod coupled with the CRDM and terminating in a "spider" or other coupling element that supports the plural control rods. In such an assembly, the CRDM moves the plural control rods, along with the spider and the connecting rod, together as a unit.

The control rod guide frames of a typical PWR reactor are housed in the reactor internals. The control rod guide frames provide an alignment feature for the control rod assembly between the nuclear reactor core (i.e. fuel) and the CRDMs external to the pressure vessel (or, in some embodiments, internal to the pressure vessel and located above the reactor core). The guide frames provide guidance for the control rod assembly when being withdrawn from the fuel for both power shaping (i.e. gray) rods and shutdown rods. When the control rods are partially or wholly withdrawn from the reactor core, they are guided by the control rod guide frame so as to ensure that the control rods remain in precise alignment with the aligned passages (i.e. guide tubes) within the reactor core. The guide frame provides lateral support for the control rods within the control rod assembly. Some guide frames provide continuous support of the control rods while others provide periodic support of the control rods through the use of spaced-apart guiding plates.

In one typical guide frame configuration, a plurality of spaced apart guide plates is secured together by a frame, e.g. tie rods. In operation, the control rods are guided as they pass through openings in the guide plates. Such a guide frame design has advantages including low weight and material cost, and limited impedance of primary coolant flow due to the largely open design. The use of guide plates to define the control rod guiding surfaces also provides a convenient planar form for the precision metalwork.

Shargots et al., U.S. Pat. Pub. No. 2012/0099691 A1 discloses a control rod guide frame comprising a self-supporting stack one or more columnar elements defining a central passage. The columnar elements may include mating features that mate at abutments between adjacent columnar elements of the stack. The control rod guide frame is suitably used in conjunction with a CRDM operatively connected with at least one control rod, and a nuclear reactor core, in which the CRDM moves the at least one control rod into and out of the nuclear reactor core under guidance of the control rod guide frame. In another embodiment, a control rod guide frame comprises a stack of one or more columnar elements defining a central passage having a constant cross-section as a function of position along the central passage. In another embodiment, a control rod guide frame comprises an extruded columnar element providing continuous control rod guidance. Shargots et al., U.S. Pat. Pub. No. 2012/0099691 A1 is hereby incorporated into this patent application by reference in the entirety.

Being able to provide continuous support of the control rods, e.g. as in embodiments of U.S. Pat. Pub. No. 2012/0099691 A1, is advantageous because there is a reduced risk of control rod buckling during rod insertion into the fuel, either by SCRAM or a controlled shutdown. In addition, continuously supporting the control rods helps reduce flow induced excitation of the control rods in turn helping reduce wear.

In guide frames constructed from a series of plates spaced a distance apart from each other with segmented tubes inserted between the plates and then welded into place at every location, the manufacturing process is labor intensive, requires a significant number of welds, and is susceptible to welding induced distortions.

BRIEF SUMMARY

In some illustrative embodiments, a control rod guide frame has a central passage of constant cross-section as a function of position along a central axis that passes through the central passage. The central passage is sized and shaped to guide a traveling assembly including at least one control rod as the traveling assembly moves along the central axis. The control rod guide frame comprises at least two radial guide frame sections secured around and defining the central passage. In some embodiments each radial guide frame section comprises an extruded radial guide frame section, which may be made of extruded steel. The central passage may include control rod guidance channels parallel to the central axis and machined into the extruded radial guide frame sections. In some embodiments the at least two radial guide frame sections secured around and defining the central passage are interchangeable. In some such embodiments, the at least two interchangeable radial guide frame sections are secured around the central passage with alternating up and down orientations. In some embodiments the at least two radial guide frame sections consist of between four and eight radial guide frame sections.

In some illustrative embodiments, an apparatus comprises a control rod guide frame as set forth in the immediately preceding paragraph, and further comprises a nuclear reactor core comprising a fissile material and a control rod drive mechanisms (CRDM) arranged to control movement of the traveling assembly as the traveling assembly moves along the central axis.

In some illustrative embodiments, a method comprises: extruding at least two radial guide frame sections using a hot extrusion process; and assembling the guide frame sections to form a control rod guide frame body having a central passage of constant cross-section as a function of position along a central axis that passes through the central passage, the central passage sized and shaped to guide a traveling assembly including at least one control rod as the traveling assembly moves along the central axis. In some embodiments, after the extruding and before the assembling, surfaces of the guide frame sections are machined to define control rod guidance channels which form part of the central passage and are oriented parallel to the central axis in the assembled control rod guide frame body. In some embodiments the extruding comprises extruding steel to form the at least two radial guide frame sections using a hot extrusion process, and applying torque during or after the extruding to minimize torsion in the extruded radial guide frame sections.

BRIEF DESCRIPTION OF THE DRAWINGS

The invention may take form in various components and methods of manufacturing. The following is a brief description of the drawings, which are presented for the purposes of illustrating the exemplary embodiments disclosed herein and not for the purposes of limiting the same.

DETAILED DESCRIPTION OF THE PREFERRED EMBODIMENTS

Figure 1:
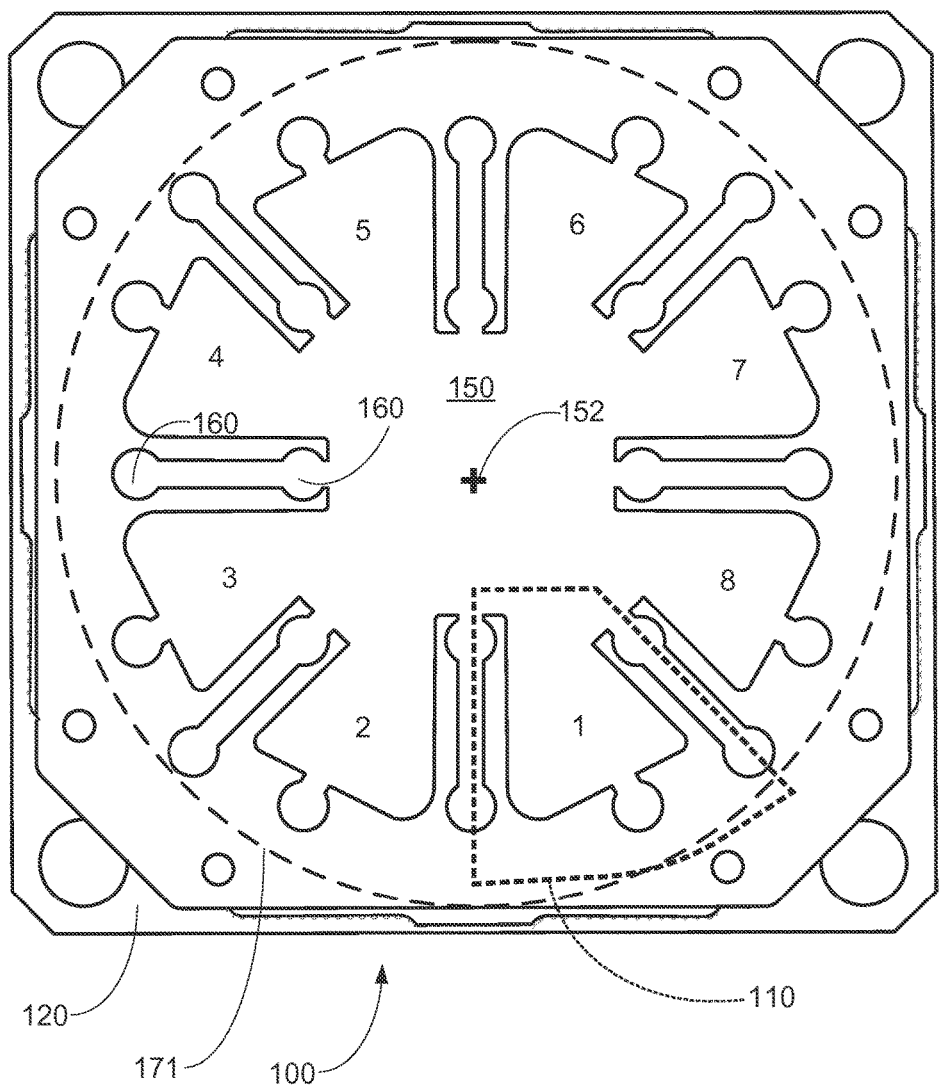
FIG. 1 illustrates a plan (or end) view of an illustrative control rod guide frame 100.

The various features of novelty which characterize the invention and methods are pointed out with particularity in the claims annexed to and forming a part of this disclosure. For a better understanding of the invention and methods, its operating advantages and specific benefits attained by its uses, reference is made to the accompanying drawings and descriptive matter in which exemplary embodiments of the invention are illustrated. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The extruded guide frame may be referred to as a control rod guide frame as previously discussed herein. Accordingly, one disclosed embodiment, an extruded guide frame comprises one or more final extrusion guides assembled to define a central passage having a constant cross section as a function of position along the central passage.

Another disclosed embodiment comprises an extruded guide frame defining a central passage into which the at least one control rod can be withdrawn, the central passage providing continuous guidance along the entire length of the portion of each control rod of the plurality of control rods that is withdrawn into the central passage.

Another disclosed embodiment comprises a final extrusion guide including an outer body and at least one guidance tab connected to the outer body.

Another disclosed embodiment comprises a method of manufacturing an extruded guide frame that includes assembling at least two or more final extrusion guides so as to form the extruded guide frame.

Another disclosed embodiment comprises a method of manufacturing a final extrusion guide including: extruding one or more extrusion guides using a hot extrusion process.

Referring to the drawings generally, wherein like reference numerals designate the same or functionally similar elements throughout the drawings, and to FIG. 1 in particular, there is shown a plan view of the geometry of the extruded guide frame 100. There are various extrusion vendors that manufacture special shape extrusions, allowing for a guide frame of this geometry to be extruded in some form. Due to the size, shape, and material of the extruded guide frame, a hot extrusion process is suitably used. The guide frame may be made of various commercial metal materials such as stainless steel, or other similar metals or metal alloys, and should be robust in the reactor environment. Preferably, the guide frame material chosen for manufacturing is stainless steel. A stainless steel guide frame typically cannot be extruded in a single piece as shown in FIG. 1 with conventional extrusion techniques. As a result, the guide frame is preferably extruded in multiple sections.

FIGS. 1-4 show end, exploded perspective, perspective, and side views, respectively, of an illustrative control rod guide frame 100 which is a continuous guide frame rather than being constructed of spaced apart guide plates. The extruded guide frame disclosed herein, in general, comprises multiple extruded sections. The illustrative guide frame 100 comprises eight (8) guide frame sections 110. The exploded view of FIG. 2 designates the eight guide frame sections 110, while the perspective and side views of FIGS. 3 and 4 designate a guide frame body 112 formed by the assembly of the eight guide frame sections 110. In the plan or end view of FIG. 1, the eight guide frame sections 110 are individually designated as sections "1"-"8", one of which (section "1") is indicated by dotted lines in FIG. 1 and the other seven sections "2"-"8" being indicated by numeric labels. The eight sections are preferably fabricated from identical extrusions, although other manufacturing approaches are contemplated. The numbered sections 1 through 8 are only shown in FIG. 1 as schematic reference labels to identify the eight separate sections, and are, therefore, not intended to indicate a specific order of assembly, machining or the like. More generally, the number of extruded (or otherwise fabricated) sections can be two, three, four, five, six, seven, eight, or more. Moreover, while the illustrative eight (8) separate extruded sections are all identical to each other, this is not required. For example, different extruded sections may variously include or omit fluid flow passages (optional features discussed further elsewhere herein), or so forth.

Figure 5:
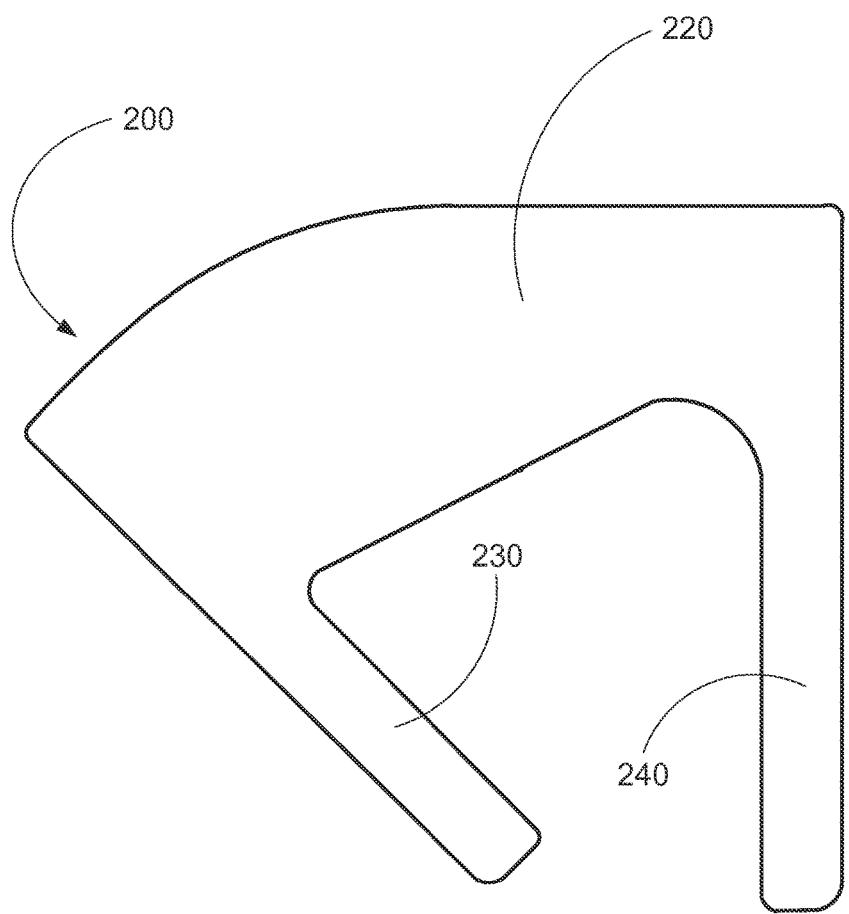
FIG. 5 illustrates a plan (or end) view of one extrusion element used in constructing the guide frame of FIGS. 1-4.

FIG. 5 illustrates a plan (or end) view of one extruded element 200 from which an extruded section 110 of FIG. 1 is suitably fabricated. A typical extrusion process with typical tolerances can only reach a "near-perfect" geometry, and a subsequent (i.e. post-extrusion) machining process is applied to the extruded element 200 to form finer features of the extruded section 110. Extruded element 200 illustrates the near perfect geometry of the as-extruded source element that is subsequently machined to form extrusion section 110 (section 1) of FIG. 1. Extruded element 200 comprises an outer body 220 and guide tabs 230 and 240.

Figure 6:
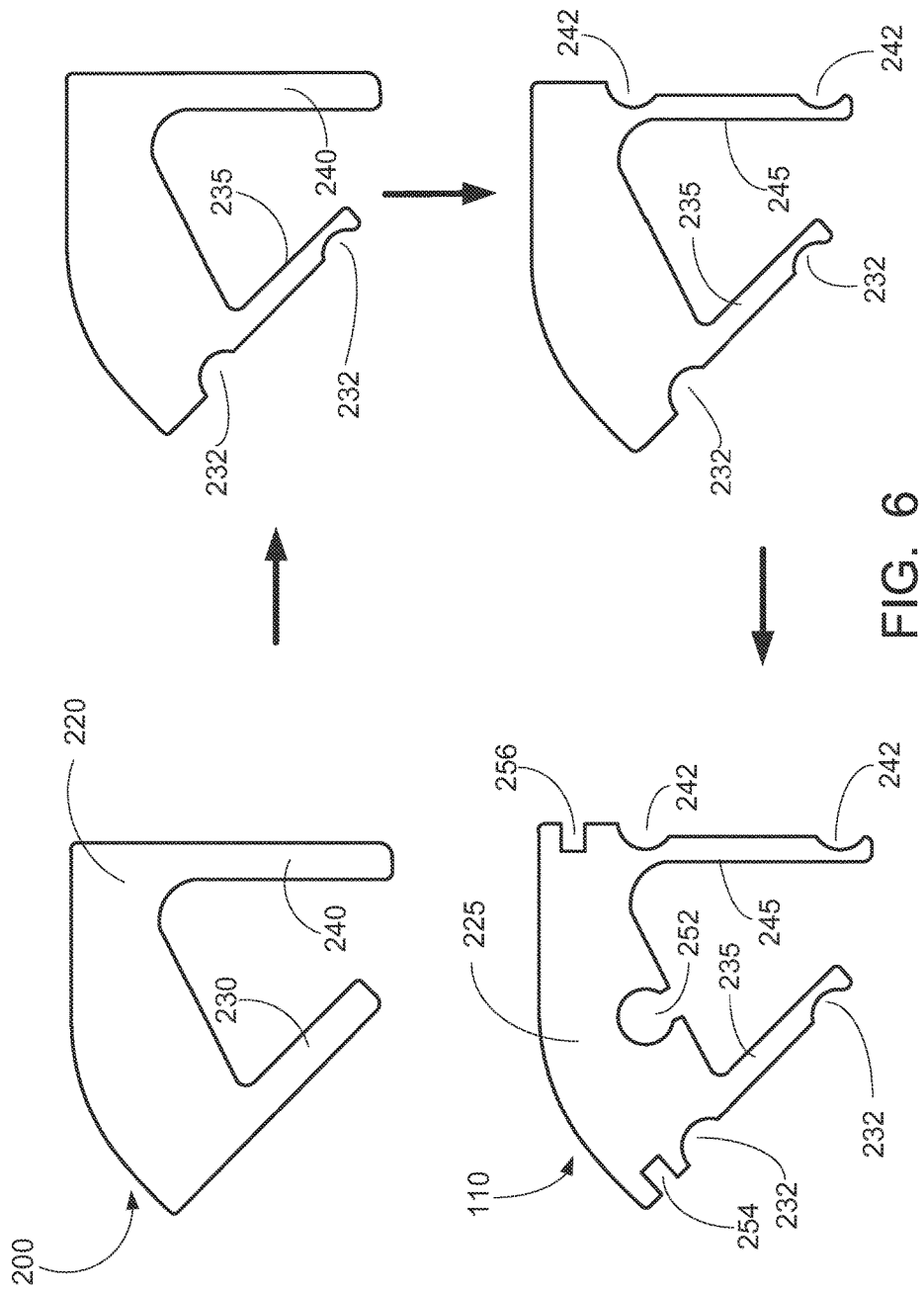
FIG. 6 diagrammatically shows a method of manufacturing a section of the guide frame of FIGS. 1-4 from the extrusion element of FIG. 5.

FIG. 6 diagrammatically shows machining performed on the extruded element 200 to form one of the extruded sections 110 of the guide frame 100 of FIGS. 1-4. As shown in FIG. 6, two (2) control rod guidance channels 232 are machined in guide tab 230 of the original extrusion 200 to generate a modified guide tab 235. Similarly, two (2) control rod guidance channels 242 are machined in guide tab 240 of the original extrusion 200 to generate a modified guide tab 245. One (1) control rod guidance channel 252, along with optional alignment slots 254, 256, are machined in outer body 220 to form a modified outer body 225. The alignment slots 254, 256, if included, provide features for aligning neighboring guide frame sections 100 in the assembled guide frame body 112, and do not necessarily extend the entire length L of the extrusion. The final geometry and shape of the guide frame section 110 comprises the modified body 225 and modified guide tabs 235, 245, as illustrated in FIG. 6. It is contemplated to machine guide tabs in other order than that shown in FIG. 6. Other permutations of guide tab shapes and layouts are also contemplated.

In a suitable embodiment, each guide frame section 110 is manufactured by extrusion to form the "near perfect" element 200, followed by machining to form the various features 232, 242, 252, 254, 256. Some suitable machining methods include electrical discharge machining (EDM) and/or end mill machining, although other machining methods are also contemplated. The combination of extrusion to produce the "near perfect" element 200 followed by machining to form the fine features, 232, 242, 252, 254, 256, especially those features 232, 242, 252 that serve as cam surfaces for guiding the control rods, has advantages in terms of efficiency, minimal material use, and achievable tolerances. However, other manufacturing methods are contemplated for forming the guide frame sections 110. For example, the guide frame section 110 may be machined from bar stock. An issue that can arise of extrusion is employed to form the "near perfect" element 200 is the potential for twisting of the element during the extrusion process. The asymmetric geometry of the element 200 increases the potential for such twisting to occur during the extrusion process. To counteract this effect, it may be necessary to apply torque during or after extrusion to minimize torsion in the extruded section 200 (such techniques are known in the extrusion arts as hot untwist techniques).

Figure 2:
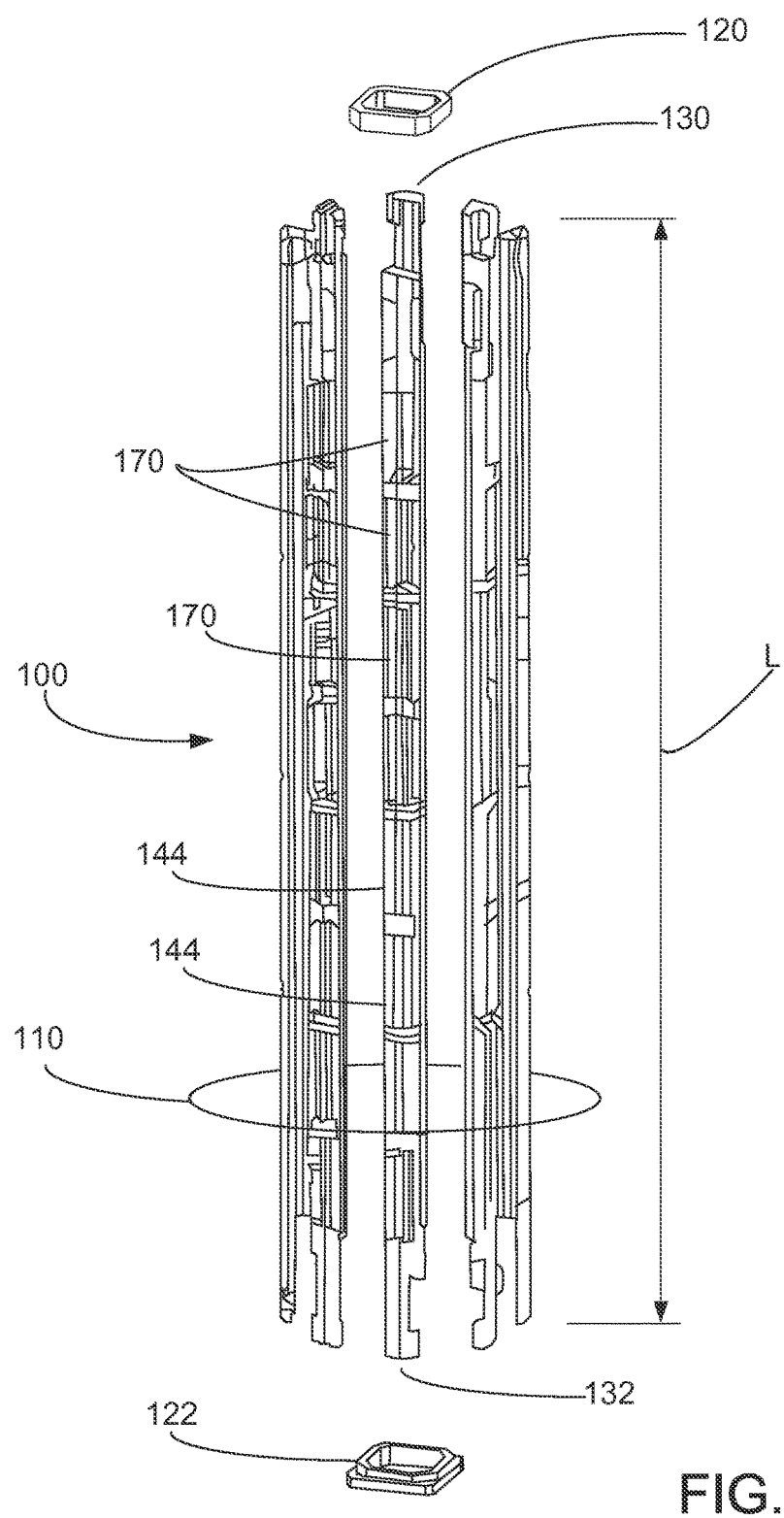
FIG. 2 illustrates an exploded perspective view of the control rod guide frame assembly of FIG. 1.

Referring back to FIG. 2, an exploded view of the guide frame assembly 100 is shown. The cross-sectional geometry of guide frame 100 is uniform for the entire length L of the overall final extruded guide frame. As seen in FIG. 2, the guide frame 100 further includes an upper end plate 120 and a lower end plate 122. An upper end 130 of the illustrative extruded guide frame 100 assembly includes the upper plate 120 that may connect with the CRDM unit (not shown), while a lower end 132 of the extruded guide frame 100 assembly includes the lower plate 122 that connects with the support plate (not shown) which is an upper part of, or proximate to, the fuel core former (not shown). The upper plate 120 and bottom plate 122 may be cut and/or machined from plate stock using suitable manufacturing methods, such as laser or water jet cutting, etc., but not limited thereto, because they are short pieces. Although not shown, it is contemplated to include mounting blocks or other intermediate components to facilitate the connection of the extruded guide frame assembly 100 with the CRDM unit and/or with the support plate.

Figure 3:
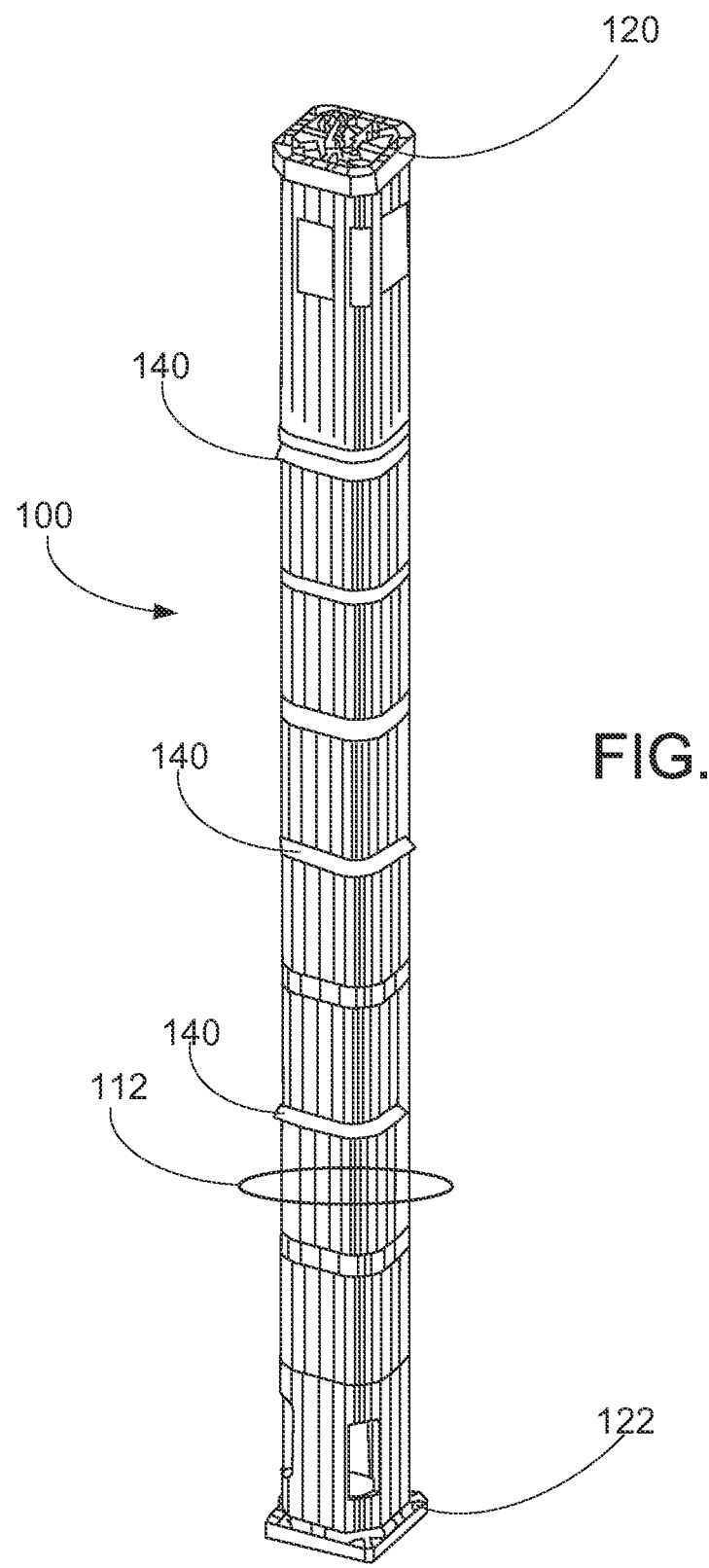
FIG. 3 illustrates a perspective view of the assembled control rod guide frame of FIG. 1.
Figure 4:
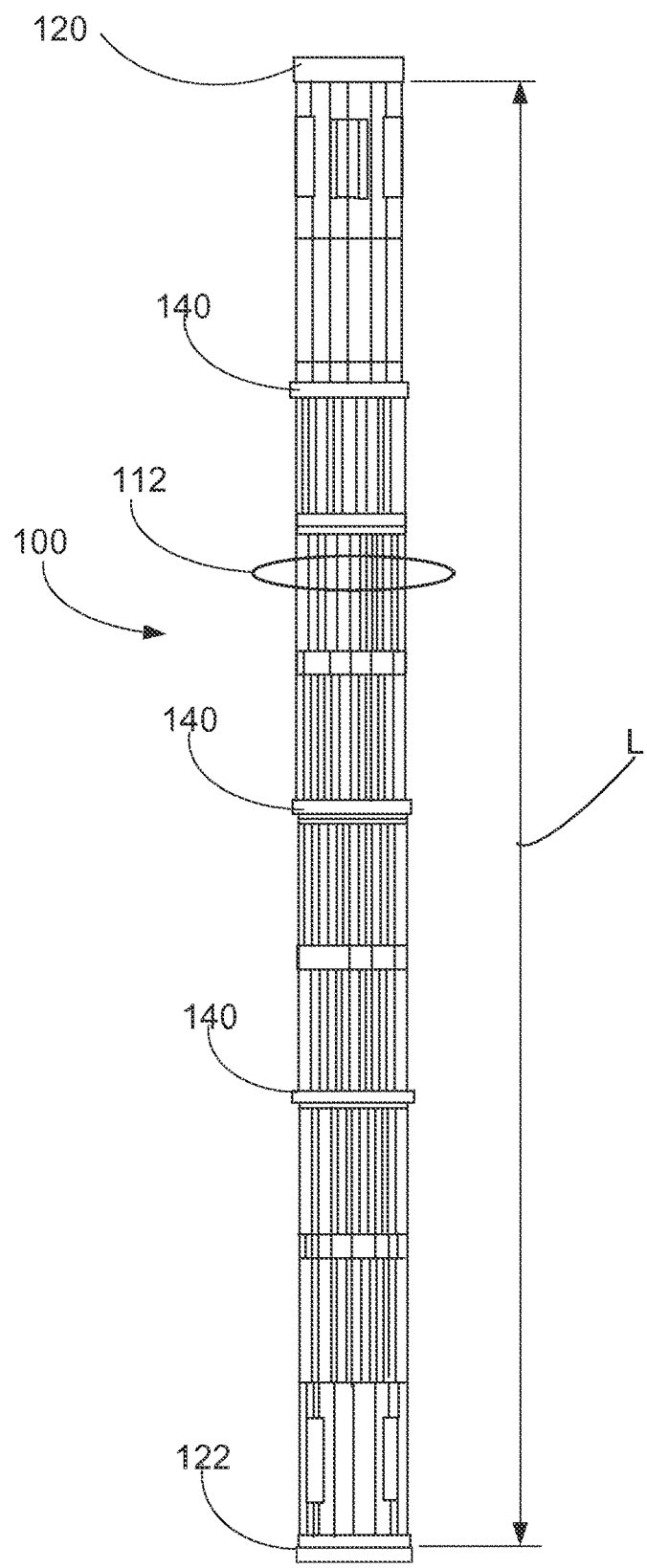
FIG. 4 illustrates a side view of the control rod guide frame of FIG. 1.

After machining, the full length guide frame sections 110 are assembled through a series of keys and locking features to form the guide frame body 112. With particular reference to FIGS. 3 and 4, the locking features may include bands 140 wrapped around the outside of the extrusions 110 at various locations, welding along the seams 144, and/or bolting the sections together. The illustrative bands 140 may, for example, be formed as bar stock that is heated and wrapped around the guide frame body 112, optionally with the bar stock fitting into a mating groove formed into the post-extrusion machining described herein with reference to FIG. 6. The upper plate 120 and bottom plate 122 are attached to the already assembled guide frame body 112 to complete assembly of the extruded guide frame 100.

Referring back to FIG. 1, the guide frame sections 110 are assembled to define a central passage 150 through the extruded guide frame assembly 100. The central passage 150 has a substantially constant cross-section along its axial length (L as shown in FIGS. 2 and 4) of the extruded guide frame assembly 100. Said another way, the extruded guide frame assembly 100 defines a central axis 152 and the central passage 150 lies along the central axis 152 and has a substantially constant cross-section in the plane transverse to the central axis 152 at positions along the central axis.

The connecting rod and the control rods (not shown) are assembled to be parallel with the central axis 152 defined by the extruded guide frame assembly 100. Or, viewed in the alternative, the extruded guide frame assembly 100 is assembled such that its central axis 152 is in parallel with the connecting rod and the control rods. In some embodiments, the translating assembly comprising the control rods and the coupling element (e.g. spider) is centered on the central axis 152. Such centering provides advantageous a balance-enhancing symmetry to the moving assembly; however, it is also contemplated for the center-of-mass of the control rods and/or the spider or other coupling element to be positioned "off-center" respective to the central axis 152.

The central passage 150 is sized and shaped to receive the illustrative coupling element (not shown) (or to receive the spider, in embodiments employing a spider as the coupling element) with a relatively small tolerance between the outer surface of the coupling element and the surfaces of the central passage 150. An illustrative "heavy" coupling element (not shown) is described in further detail in Shargots et al., U.S. Pub. No. 2012-0051482 filed Aug. 24, 2010 and titled "Terminal elements for coupling connecting rods and control rods in control rod assemblies for a nuclear reactor", which is incorporated herein by reference in its entirety. More generally, the extruded guide frame assembly 100 disclosed herein is suitably used with conventional spiders, or with other types of coupling elements, or with no connecting element at all (for example, a configuration in which a single control rod is directly coupled with the lower end of a connecting rod).

The central passage 150 also includes control rod guidance channels 160 which are parallel with the central axis 152 and extend completely through entire length (L as shown in FIGS. 2 and 4) of the extruded guide frame assembly 100. Each control rod guidance channel 160 is sized and positioned to receive a corresponding control rod of the plurality of control rods (not shown). Because the central passage 150 (including the guidance channels 160) has a constant cross-section as a function of position along the central passage, any portion of a control rod that is disposed in the central passage 150 and more particularly in the control rod guidance channel 160 aligned with that control rod) is guided by the central passage 150 (and more particularly is guided by the surfaces of the aligned control rod guidance channel 160) over the entire length of the portion of the control rod that is disposed in the central passage. Said another way, the control rod guidance channel 160 provides continuous guidance for the entire portion of the control rod that is withdrawn into the extruded guide frame assembly 100.

Phraseology such as "guidance" or "guiding surfaces" denote surfaces or structures (e.g., the guidance channels 160) that guide the control rods insofar as they keep the control rod straight in its intended orientation within a specified tolerance. Typically, the guidance channels 160 have a slightly larger diameter as compared with the control rods, with the difference defining the allowed tolerance of movement of the guided control rod. If the control rod attempts to deviate beyond this tolerance, for example due to mechanical vibrational force or incipient bowing of the control rod, the control rod cams against the guiding surfaces of the guidance channels 160 to prevent vibrational movement or bowing of the control rod beyond the allowable tolerance. By making the guidance channel 160 slightly larger than the control rod diameter, the control rod is allowed to move down or up (that is, inserted into or withdrawn from the core) without frictional resistance from the guidance channel 160. However, it is also contemplated for the guidance channel 160 to be sized to precisely match the diameter of the control rod, so that the motion tolerance is minimized at the cost of some frictional resistance to control rod insertion or withdrawal. The foregoing sizing of the guidance channels 160 is also suitably chosen taking into account any differential thermal expansion of the control rods compared with the stainless steel or other material comprising the extruded guide frame assembly 100.

It will be noted that the illustrative guidance channels 160 do not form complete closed cylindrical passages, but rather are partially "connected" with the main volume of the central passage 150. The central passage 150, including the guidance channels 160, thus has a simply connected cross-section without any "detached" passage cross-section portions. This allows the assembly including the coupling element (e.g. spider) and the coupled bundle of control rods to move unimpeded through the length of the central passage 150. Each guidance channel 160 surrounds the circular cross-section of its guided control rod over a sufficient fraction of the perimeter of the control rod so as to prevent movement of the control rod beyond allowable tolerance in any direction. Moreover, while the illustrative guidance channels 160 are shaped to guide control rods having circular cross-sections, it is also contemplated for the control rods to have square, hexagonal, octagonal, or other cross-sections, in which case the corresponding control rod guidance channels have correspondingly shaped cross-sections that again are typically slightly enlarged compared with the control rod in correspondence with the allowable motion tolerance for the guided control rod.

Referring to FIG. 2, in one embodiment flow slots 170 may be machined in the guide sections 110 at various locations along its length L. These flow slots 170 provide an additional or alternative way to alleviate hydraulic pressure buildup in the central passage 150 during a SCRAM to provide fluid communication between the central passage 150 and the exterior of the extruded guide frame assembly 100. The flow slots 170 are machined into the body of the guide sections 110, and are not coextensive with the length L of the guide frame sections 110 (and hence are not part of the central passage 150 which passes through the assembled guide frame 100). The flow shaped fluid flow passages or flow slots 170 are illustrative examples, and other shapes and dimensions of fluid flow passages are also contemplated, such as holes (square, circular, or otherwise shaped), spiraling slots, or so forth.

While a continuous constant cross-section is preferred, in one alternative embodiment the cross section geometry tapers slightly along a vertical axis of extruded guide frame such that a degree of hydraulic resistance may be utilized to enable additional control of the component velocity during SCRAM.

The construction of the guide frame 100 using multiple sections 110 has certain advantages. As previously noted, the combination of extrusion to produce the "near perfect" element followed by machining to form the fine control rod cam surfaces 232, 242, 252 has advantages in terms of efficiency, minimal material use, and achievable tolerances. However, a typical light water reactor operates at high coolant water temperature, e.g. on the order of 250° C.-350° C. for typical boiling water reactor (BWR) and pressurized water reactor (PWR) designs. For these operating temperatures, the guide frame is typically made of steel, which is difficult to extrude. Extruding the guide frame body 112 as a single element would entail expelling a large amount of steel from the center of the steel stock to form the central passage 150, and would require a complex extrusion die. (With brief reference back to FIG. 1, this is seen in that the perimeter 171 passes through metal along its entire circumference, meaning that removal of material to form the central passage 150 entails expelling this material out the end of the stock steel bar.) By extruding the guide frame body 112 as at least two radial sections, these difficulties are alleviated, as the extruded elements that are machined to form the radial guide frame sections do not have central openings. Extrusion of the guide frame body 112 as more than two sections, e.g. as eight section 110 in the illustrative example, further reduces the required cross-section of the source stock steel bar required and the energy per extrusion required to form the extruded element 200. Additionally, less steel material is removed during the extrusion, reducing the cost of source steel material. Still further, by forming the guide frame body 112 as two or more sections (whether by extrusion or another manufacturing technique such as casting or machining a stock steel bar), the control rod cam surfaces 232, 242, 252 of each section 110 are exterior surfaces, that is, not surfaces inside a central opening. This facilitates machining access to these surfaces.

In one illustrative embodiment, the guide frame 100 is extruded in ⅛ sections (eight (8) separate multiple extrusion guide sections 110). Other numbers of sections are contemplated, e.g. another embodiment may be extruded in ¼ sections (four (4) separate extruded guide sections), or another embodiment may be extruded in ⅓ sections (three (3) separate multiple extrusion guide sections). In yet still another embodiment of the present invention may be extruded in ½ sections (two (2) separate multiple extrusion guide sections). In yet still another embodiment of the present invention may be extruded as a single extruded guide frame.

In one embodiment, all of the machined features of final extrusion guide 110 may instead be formed by the extrusion process, so that no post-extrusion machining is required.

Any suitable assembly method may be used to assemble the extruded guide frame sections 110 to form the assembled guide frame body 112, including, but not limited to, banding, welding, and physical attachment means. Physical attachment means, includes, but is not limited to, screws, rivets, bolts, tensioners, clamps, pins, etc., or any combination thereof or any other attachment means.

Manufacturing the guide frame by extrusion reduces the cost of both the guide frame itself and the overall reactor. The guide frame sections 110 can be extruded the entire length L of the overall guide frame 100 (neglecting the small thicknesses of the end plates 120, 122). This eliminates the need to align a plurality of stacked columnar elements as disclosed in U.S. Pat. Pub. No. 2012/0099691 A1, and reduces the amount of labor and welding involved with manufacturing the guide frame. In one contemplated embodiment, the guide frame is approximately 9.5 feet tall. The extruded guide frame may be made of stainless steel, Inconel, zircalloy, or some combination thereof. Once the dies are made for the extrusions, multiple extrusion sections can be extruded quickly and cheaply, with very little waste material left over.

Figure 7:
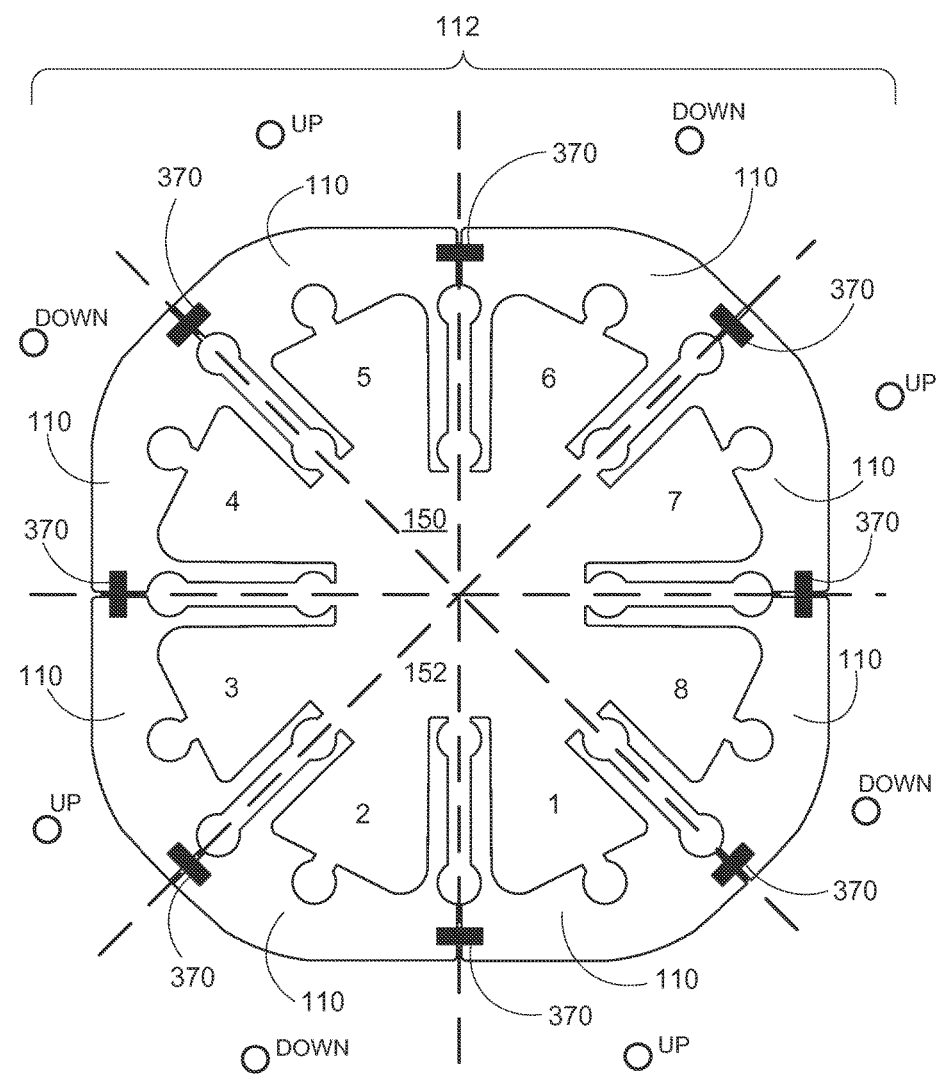
FIG. 7 illustrates a plan (or end) view of the control rod guide frame of FIGS. 1-4, with the end plates removed, in which the sections are connected by keys.

FIG. 7 illustrates a plan (i.e. end) view of the guide frame body 112 in which the guide frame sections 110 are connected by keys 370. In FIG. 7, dashed radial lines extending from the central axis 152 delineate the boundaries between neighboring guide frame sections 110. The guide frame body 112 is a continuous guide frame comprising one columnar element (or alternatively several stacked columnar elements) made of multiple guide frame sections 110 secured together by welding, to form the guide frame body 112. In the embodiment shown in FIG. 7, eight (8) guide frame sections 110 as shown which are identical, although more or fewer sections are contemplated. It should be noted that the eight sections 110 of FIG. 7 are identical except for orientation: Four sections 110 have orientations designated $O^{UP}$, while the remaining four sections 110 have orientations $O^{DOWN}$. The two orientations $O^{UP}$ and $O^{DOWN}$ are flipped 180° relative to one another, as indicated more particularly by the feature labeling shown in FIGS. 8 and 9 for orientations $O^{UP}$ and $O^{DOWN}$, respectively (where the reference numbers correspond to those used in FIG. 6 in labeling the final machined guide frame section 110). In FIG. 7, the numbered sections "1" through "8" are again only indicated by reference labels to identify the eight separate sections, and again are not intended to indicate a specific order of assembly, machining or the like, or to limit this disclosure in any manner. While the illustrative eight (8) separate extruded sections 110 are all identical to each other (except for the orientation $O^{UP}$ and $O^{DOWN}$ in the assembled guide frame body 112), this is not required. For example, different sections may variously include or omit fluid flow passages formed during the machining (optional features discussed further elsewhere herein), or so forth.

By way of further illustration, in the embodiment of FIG. 7, the sections 110 include the alignment notches 254, 256 (see FIGS. 8 and 9), and keys 370 are inserted into the notches of neighboring guide frame sections 110 to align the neighboring sections to form the columnar element. The keys 370 may, for example, be standard-sized steel bar stock (suitable for embodiments in which the guide frame sections 110 are steel). Additionally or alternatively, pins or other mating features may be incorporated into the upper and lower end plates 120, 122 to provide alignment of the guide frame sections 110.

Figure 8:
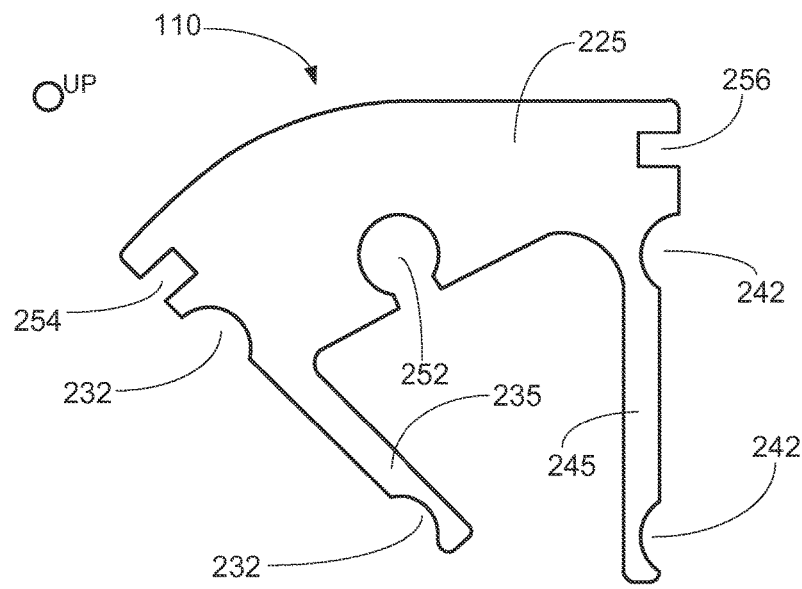
FIGS. 8 and 9 illustrates plan views of one section of the guide frame of FIG. 7 in the $O^{UP}$ orientation (FIG. 8) and in the $O^{DOWN}$ orientation (FIG. 9).
Figure 9:
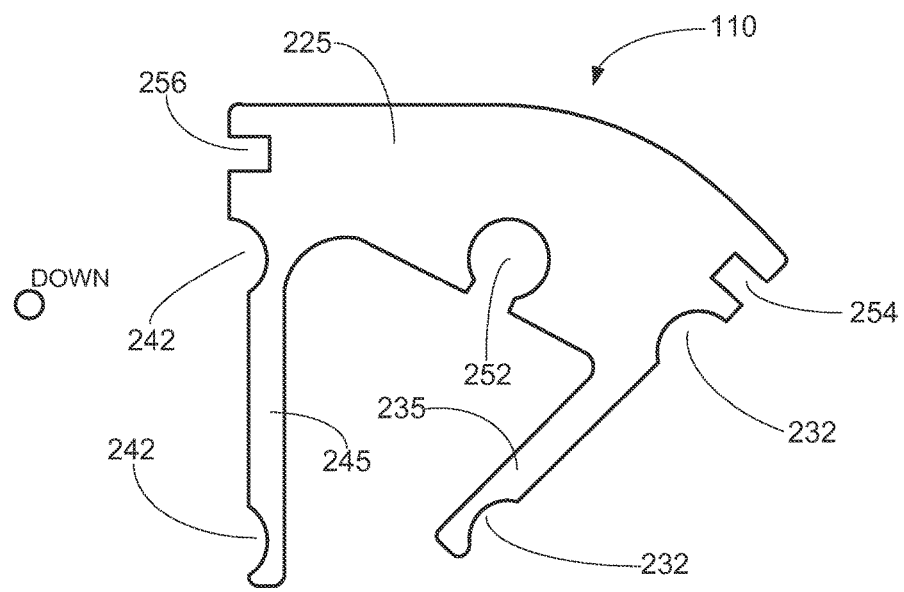

The level of symmetry of the guide frame body can vary depending upon the cross-sectional geometry of the translating control rods/spider assembly (and hence the cross-sectional geometry of the central opening of the guide frame), and can also vary depending upon the number and choice of radial guide frame sections. For example, the illustrative guide frame assembly 112 shown in FIG. 7 employs eight radial guide frame segments 110, and these can be made from the same extruded element 200 (see FIG. 6) and using the same post-extrusion machining (neglecting any differences in flow passages et cetera) by alternating the $O^{UP}$ and $O^{DOWN}$ orientations as illustrated in FIGS. 7-9.

Figure 10:
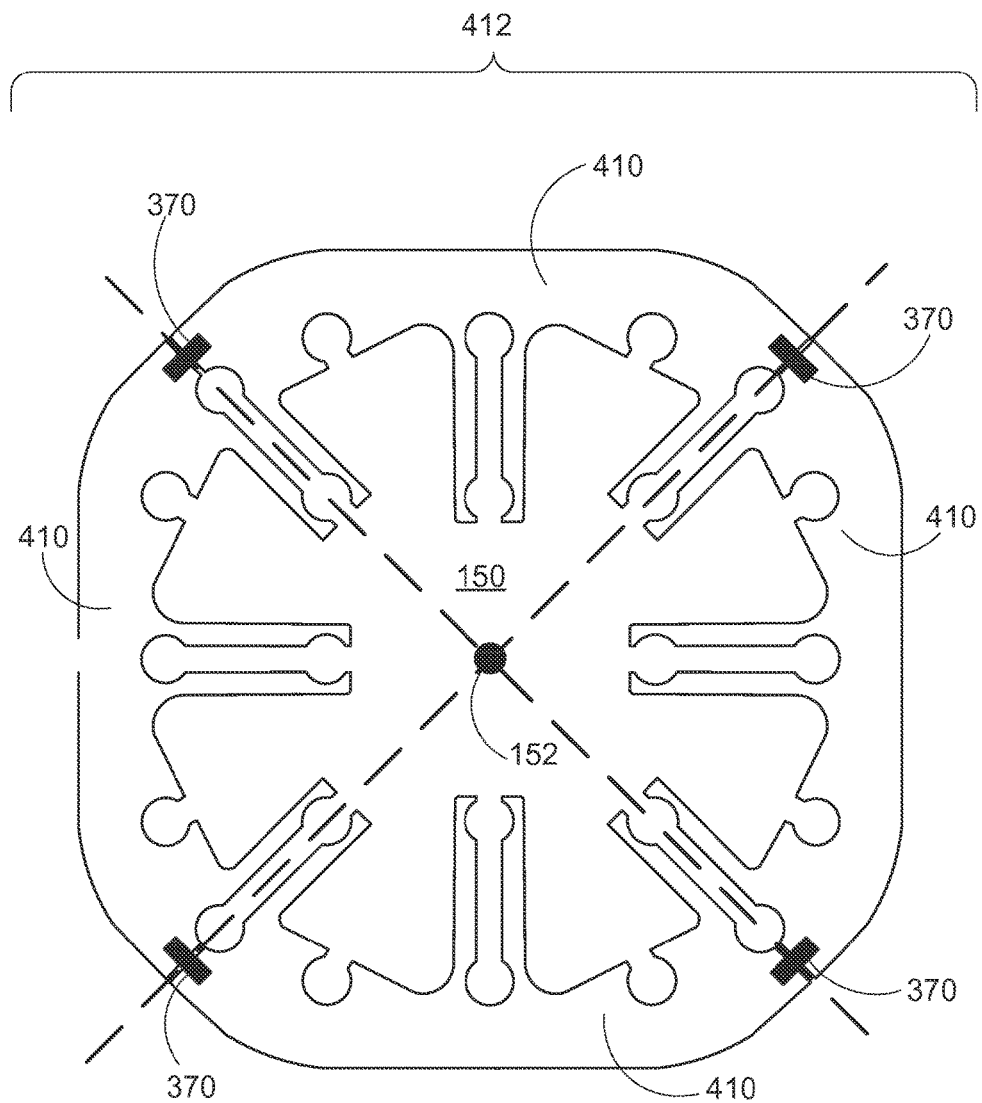
FIG. 10 illustrates a plan (or end) view of an alternative embodiment of the control rod guide frame, with the end plates removed, in which four sections make up the control rod guide frame body.

With reference to FIG. 10, in an alternative embodiment, the same guide frame geometry can be constructed using only four radial guide frame segments 410 to form a guide frame body 412 having the same central passage 150 as in the embodiment of FIG. 7. Again, dashed radial lines extending from the central axis 152 delineate the boundaries between neighboring guide frame sections 410. In this embodiment, the four guide frame segments 410 can be formed from identical extrusions, and additionally the reversing $O^{UP}$ and $O^{DOWN}$ orientations are not needed—rather, all four guide frame segments 410 suitably have the same orientation. Only four keys 370 are needed in this embodiment as there are only four radial seams. In some embodiments the extrusions may be identical but different machining sequences may be needed for different sections.

The embodiments depicted in the figures are intended to illustrate in a nonlimiting way to the ordinarily skilled artisan the breadth and scope of potential various embodiments of the present invention that may be adapted to various extruded guide frames and manufacturing and assembly methods thereof in the field of nuclear power reactor arts, nuclear reaction control apparatus arts, control rod assembly arts, and related arts. Accordingly, other various embodiments are envisioned, such as, the extruded guide frame with flow slots and an extruded guide frame extruded in ¼, ⅓, and ½ extrusion guide sections, or a single extruded guide frame, as discussed above in other embodiments disclosed herein.

Figure 11:
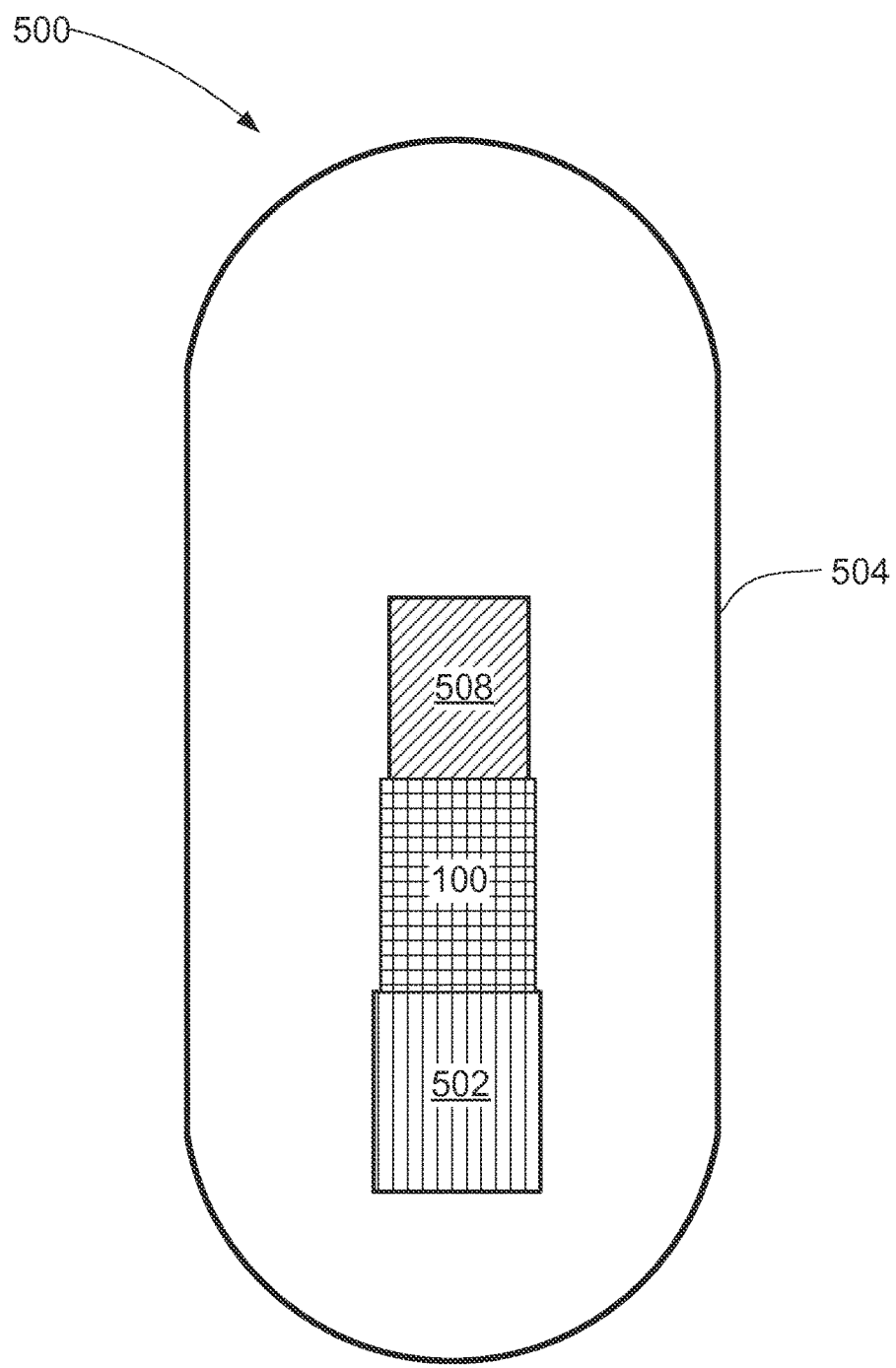
FIG. 11 diagrammatically shows a nuclear reactor of the pressurized water reactor (PWR) variety which includes the disclosed control rod guide frames.

With reference to FIG. 11, in an illustrative application, a nuclear reactor 500 of the pressurized water reactor (PWR) variety includes a nuclear reactor core 502 comprising a fissile material disposed in a pressure vessel 504. The nuclear reaction is controlled or stopped by inserting control rods (not visible in FIG. 11) comprising a neutron-absorbing material into aligned passages within the reactor core. The control rods are operated by control rod drive mechanisms (CRDMs) 508. The control rod guide frame 100 is housed in the reactor internals inside the pressure vessel 504. The CRDMs are conventionally mounted outside the pressure vessel, e.g. on top of the pressure vessel 504 in a typical PWR, but may alternatively be mounted inside the pressure vessel 504 as diagrammatically shown in FIG. 11. The control rod guide frames 100 guide those portions of the control rods and related components (e.g. connecting spiders) in the gap between the CRDMs 508 and the reactor core 502.

Illustrative embodiments including the preferred embodiments have been described. While specific embodiments have been shown and described in detail to illustrate the application and principles of the invention and methods, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims. Obviously, modifications and alterations will occur to others upon reading and understanding the preceding detailed description. It is intended that the present disclosure be construed as including all such modifications and alterations insofar as they come within the scope of the appended claims or the equivalents thereof.

I claim:

1. An apparatus comprising:
    a control rod guide frame having a central passage of constant cross-section as a function of position along a central axis that passes through the central passage, the central passage sized and shaped to guide a traveling assembly including at least one control rod as the traveling assembly moves along the central axis,
    wherein the control rod guide frame comprises at least two radial guide frame sections that are secured to each other in alternating up and down orientations and configured to surround and define the central passage.

2. The apparatus as set forth in claim 1, wherein each radial guide frame section comprises an extruded radial guide frame section.

3. The apparatus as set forth in claim 2, wherein the central passage includes control rod guidance channels parallel to the central axis and machined into the extruded radial guide frame sections.

4. The apparatus as set forth in claim 2, wherein the extruded radial guide frame sections are made of extruded steel.

5. The apparatus as set forth in claim 1, wherein the at least two radial guide frame sections consist of between four and eight radial guide frame sections.

6. The apparatus as set forth in claim 1, wherein the central passage includes control rod guidance channels parallel to the central axis.

7. The apparatus as set forth in claim 1, wherein the control rod guide frame further comprises:
    bands wrapped around the outside of the at least two radial guide frame sections to secure the at least two radial guide frame sections together to define a control rod guide frame body of the control rod guide frame.

8. The apparatus as set forth in claim 1, wherein the control rod guide frame further comprises:
    welds at interfaces between the at least two radial guide frame sections that secure the at least two guide frame sections together to define a control rod guide frame body of the control rod guide frame.

9. The apparatus as set forth in claim 1, wherein the at least two radial guide frame sections secured around and defining the central passage define a guide frame body, and the control rod guide frame further comprises:
    a lower plate connected to a lower end of the guide frame body; and
    an upper plate connected to an upper end of the guide frame body.

10. The apparatus as set forth in claim 9, wherein each radial guide frame section is a single element that extends the entire length along the central axis between the lower and upper plates.

11. The apparatus as set forth in claim 1, wherein the at least two radial guide frame sections secured around and defining the central passage define a guide frame body having a constant outer perimeter as a function of position along a center axis.

12. The apparatus as set forth in claim 1, wherein the at least two radial guide frame sections secured around and defining the central passage define a guide frame body, and the radial guide frame sections include flow slot passages providing fluid communication between the central passage and the exterior of the guide frame body.

13. The apparatus as set forth in claim 1, wherein the control rod guide frame further comprises:
    keys disposed in alignment features of the at least two radial guide frame sections.

14. The apparatus as set forth in claim 1, further comprising:
    a nuclear reactor core comprising a fissile material; and
    a control rod drive mechanism (CRDM) arranged to control movement of the traveling assembly as the traveling assembly moves along the central axis.

15. The apparatus as set forth in claim 14, further comprising a reactor pressure vessel that contains the nuclear reactor core, the CRDM, and the control rod guide frame.

* * * * *